United States Patent
Kawakami et al.

(10) Patent No.: US 11,593,047 B2
(45) Date of Patent: *Feb. 28, 2023

(54) PRINT CONTROL SERVER AND PRINT CONTROL METHOD FOR CONTROLLING PRINTING THROUGH A SOCIAL NETWORKING SERVICE

(71) Applicant: Seiko Epson Corporation, Tokyo (JP)

(72) Inventors: Yosuke Kawakami, Matsumoto (JP); Ryosuke Kakio, Matsumoto (JP); Takashi Sera, Shiojiri (JP); Yuma Kitahara, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,192

(22) Filed: Sep. 7, 2021

(65) Prior Publication Data

US 2022/0075580 A1    Mar. 10, 2022

(30) Foreign Application Priority Data

Sep. 8, 2020 (JP) .............................. JP2020-150359

(51) Int. Cl.
*G06F 3/12* (2006.01)
(52) U.S. Cl.
CPC .......... *G06F 3/1238* (2013.01); *G06F 3/1203* (2013.01); *G06F 3/1286* (2013.01)
(58) Field of Classification Search
None
See application file for complete search history.

(56) References Cited

U.S. PATENT DOCUMENTS

| | | | |
|---|---|---|---|
| 2009/0059276 A1* | 3/2009 | Matsuo ................. | G06F 21/608 358/1.15 |
| 2018/0032297 A1* | 2/2018 | She ........................ | G06F 3/1238 |
| 2019/0317709 A1* | 10/2019 | Sugimoto ............. | G06F 3/1204 |
| 2020/0099637 A1* | 3/2020 | Kurokawa ............. | G06F 3/1222 |
| 2020/0099799 A1* | 3/2020 | Obayashi .............. | G06F 3/1258 |
| 2020/0133592 A1 | 4/2020 | Mitsuhashi et al. | |
| 2020/0233619 A1* | 7/2020 | Hosoda ................. | G06F 3/1239 |
| 2021/0089247 A1* | 3/2021 | Nakajima ............. | G06F 3/1239 |
| 2022/0075578 A1 | 3/2022 | Kawakami et al. | |
| 2022/0075580 A1 | 3/2022 | Kawakami et al. | |

FOREIGN PATENT DOCUMENTS

JP 2020-071598 5/2020

* cited by examiner

*Primary Examiner* — Henok Shiferaw
(74) *Attorney, Agent, or Firm* — Workman Nydegger

(57) ABSTRACT

A print control server that controls printing through an SNS includes a registration section configured to register, in association with each other, a first account that is an account of a user of the SNS and print setting information including designation information of a printer to be used for printing. The registration section issues a first password when accepting a designation of the first account and a designation of a second account that is an account of a user of the SNS and that is to be a share destination of a print setting, notifies the first account of the first password through the SNS, and registers, when a password posted on the SNS by the second account coincides with the first password, the print setting information registered in association with the first account also in association with the second account.

5 Claims, 4 Drawing Sheets

PRINT CONTROL SERVER AND PRINT CONTROL METHOD FOR CONTROLLING PRINTING THROUGH A SOCIAL NETWORKING SERVICE

The present application is based on, and claims priority from JP Application Serial Number 2020-150359, filed Sep. 8, 2020, the disclosure of which is hereby incorporated by reference herein in its entirety.

BACKGROUND

1. Technical Field

The present disclosure relates to a print control server and a print control method.

2. Related Art

A user who uses social networking services (hereinafter referred to as "SNSs") may post files of text, photographs, and the like on the SNS so as to publish the posts to users capable of viewing the posts. Furthermore, such a user may use a print system communicating with an SNS through a network to print a file posted on the SNS by a printer registered in advance in the print system.

Furthermore, the following information processing apparatus is disclosed (refer to JP-A-2020-71598). That is, the information processing apparatus posts, when a user who has a printer that has not been registered posts a print instruction on a chat room, a message requesting a registration of the printer on the chat room, registers, when the user posts a printer ID on the chat room in response to the post, the printer ID in association with the user, and executes printing by the registered printer.

However, according to JP-A-2020-71598, a third party may view a printer ID posted by a user on a chat room to register a printer. Therefore, there is a risk of leakage of a printer ID and settings associated with the printer to the third party who is not an appropriate user to be registered in association with the printer or a risk of inappropriate registration of the printer by the third party, and accordingly, security may not be ensured.

SUMMARY

According to an aspect of the present disclosure, a print control server that controls printing through an SNS includes a registration section configured to register, in association with each other, a first account that is an account of a user of the SNS and print setting information including designation information of a printer to be used for printing. The registration section issues a first password when accepting a designation of the first account and a designation of a second account that is an account of a user of the SNS and that is to be a share destination of a print setting, notifies the first account of the first password through the SNS, and registers, when a password posted on the SNS by the second account coincides with the first password, the print setting information registered in association with the first account also in association with the second account.

According to another aspect of the present disclosure, a print control method for controlling printing through an SNS includes a registering step of registering, in association with each other, a first account that is an account of a user of the SNS and print setting information including designation information of a printer to be used for printing. The registering step issues a first password when accepting a designation of the first account and a designation of a second account that is an account of a user of the SNS and that is to be a share destination of a print setting, notifies the first account of the first password through the SNS, and registers, when a password posted on the SNS by the second account coincides with the first password, the print setting information registered in association with the first account also in association with the second account.

DESCRIPTION OF EXEMPLARY EMBODIMENTS

Hereinafter, an embodiment of the present disclosure will be described with reference to the accompanying drawings. Note that each figure is merely an example for illustrating the embodiment. Since each figure is an example, proportions and shapes of components may not be accurate, the same components may not be consistent with each other, or some parts may be omitted.

1. System Configuration

Figure 1:
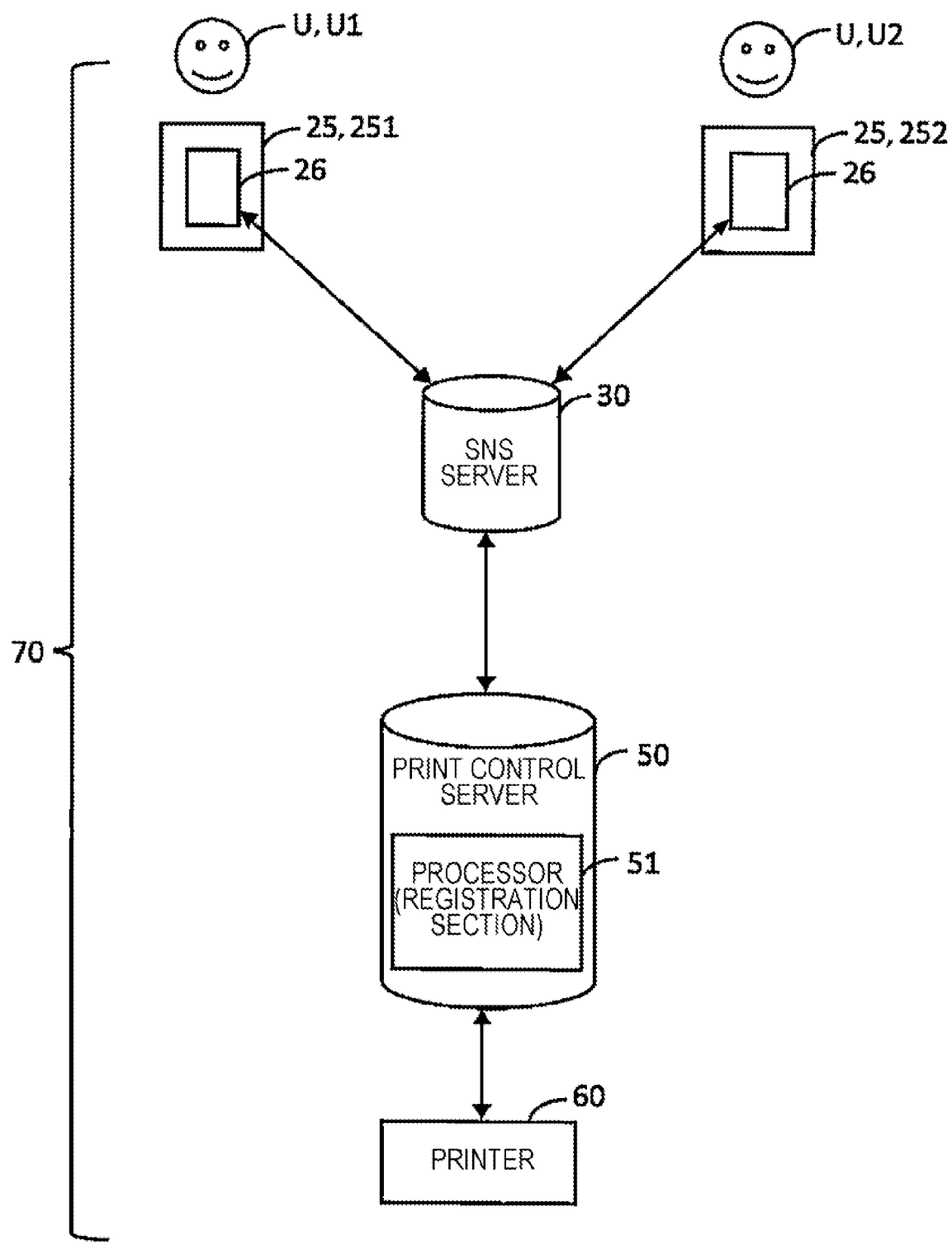
FIG. 1 is a block diagram schematically illustrating a system.

FIG. 1 is a block diagram schematically illustrating a configuration of a system 70 according to this embodiment. At least a portion of the system 70 is also referred to as a print control system. According to FIG. 1, the system 70 includes a terminal device 25, a plurality of servers 30 and 50, and a printer 60. The terminal device 25, the servers 30 and 50, and the printer 60 are connected to one another through the Internet in a communication available manner.

The terminal device 25 is a communication apparatus operated by a user U, such as a smartphone, a tablet terminal, or a personal computer (PC). A plurality of applications are installed in the terminal device 25. In the example of FIG. 1, the examples of the applications installed in the terminal device 25 include an SNS application 26 for using a certain SNS. Hereinafter, the certain SNS is simply referred to as an SNS.

Specifically, the user U is a user of the SNS. The user U has a "first account" and a "second account" in advance as SNS accounts of his/her own. The term "account" indicates information for identifying a user in an SNS and includes a user ID, a password, and other personal information. The term "account" may be rephrased as "user information".

Figure 2:
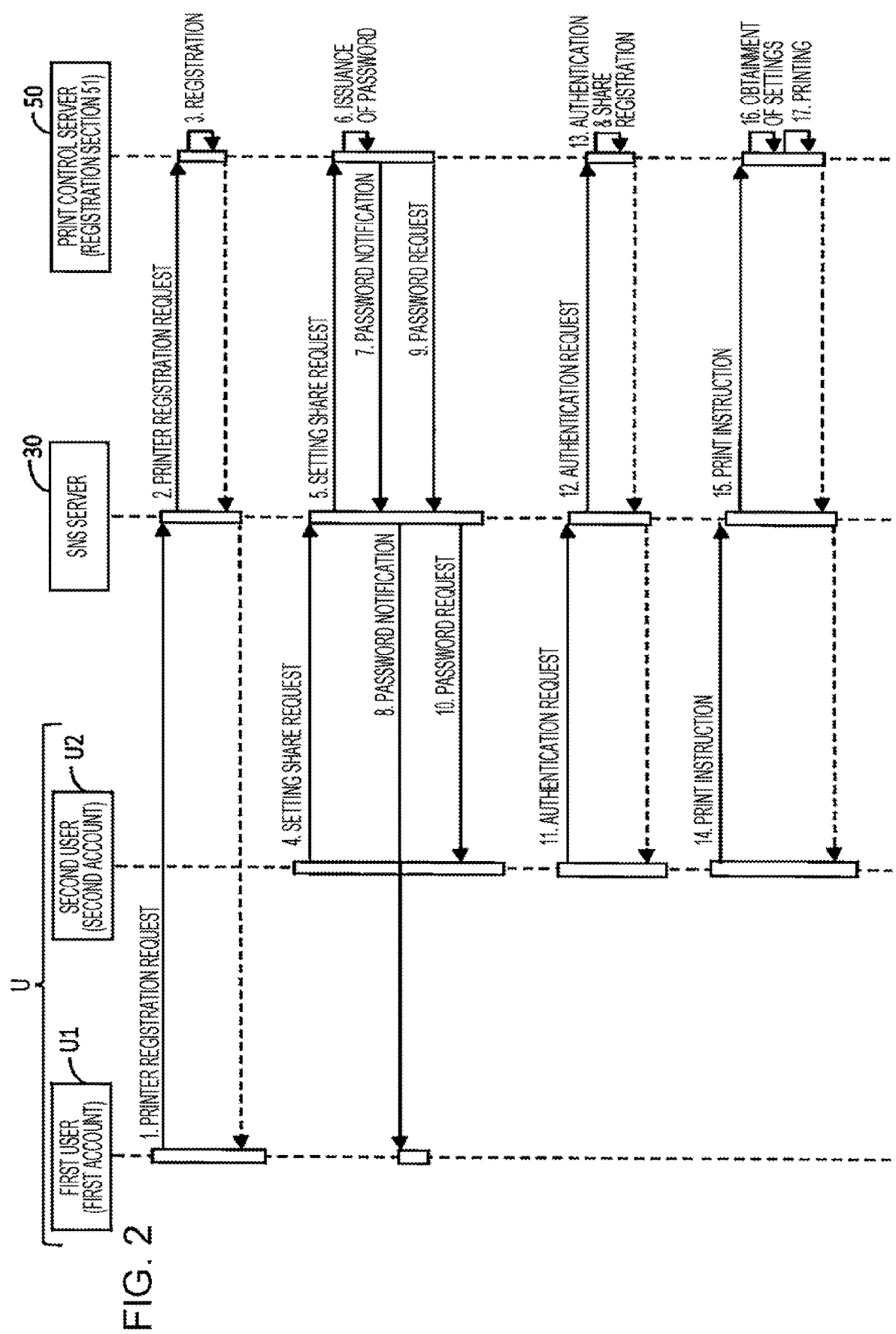
FIG. 2 is a sequence diagram illustrating a process according to an embodiment.

In FIG. 1 and FIG. 2 described below, a user U having the first account is referred to as a "first user U1" and a user U having the second account is referred to as a "second user U2" for convenience sake. Furthermore, in FIG. 1, a terminal device 25 operated by the first user U1 is referred to as a "first terminal device 251" and a terminal device 25 operated by the second user U2 is referred to as a "second terminal device 252".

The user U may indicate a single user or a plurality of users having the close relationship, such as family members or co-workers. That is, the first user U1 and the second user U2 may be the same person or different persons having the close relationship. Furthermore, the terminal device 251 and the second terminal device 252 may be the same device or different devices in practice.

The first user U1 uses the SNS by logging in the SNS application 26 activated in the first terminal device 251 using the first account. Furthermore, the second user U2 uses the SNS by logging in the SNS application 26 activated in the second terminal device 252 using the second account.

The SNS server 30 indicates a single or a plurality of servers that provide the SNS on the Internet. The SNS server 30 and the SNS application 26 cooperate with each other so that the SNS is provided for the users U having the first and second accounts.

The print control server 50 may control printing through the SNS and indicates a single server or a plurality of servers that cause the printer 60 associated with the first account to execute printing in accordance with a post of a print instruction issued from the first account to the SNS. Similarly, the print control server 50 causes the printer 60 associated with the second account to execute printing in accordance with a post of a print instruction issued from the second account to the SNS.

The SNS application 26 communicates with the print control server 50 through an application programming interface (API) provided by the SNS server 30 so as to transmit and receive information required for printing.

Only the single printer 60 is illustrated in FIG. 1. However, apparently, the print control server 50 may use a plurality of printers through the Internet.

A registration section 51 serving as a function of a processor controlling the print control server 50 registers, in association with each other, the first account and print setting information including designation information of the printer 60 to be used by the first account. Furthermore, the registration section 51 registers, in association with each other, the second account and print setting information including designation information of the printer 60 to be used by the second account.

In this embodiment, a load of the setting to be performed by the user U is reduced by efficiently performing the registration of the printer 60 required to be executed for different accounts in the same SNS. The print control server 50 realizes a print control method.

2. Printer Share Registration Process

FIG. 2 is a sequence diagram illustrating processes executed by the components included in the system 70. In FIG. 2, a process indicated by reference numerals 4 to 13 particularly corresponds to a "printer share registration process". The user U of FIG. 2 includes a user U1 specified by the first account for using the SNS through the SNS application 26 by operating the first terminal device 251 and a user U2 specified by the second account for using the SNS through the SNS application 26 by operating the second terminal device 252.

In FIG. 2, the first user U1 performs "1. Printer Registration Request" to register the printer 60 to be used in the SNS by the first account. In this case, print setting information including designation information of the printer 60 to be used by the first account is transmitted as the printer registration request from the SNS application 26 to the SNS server 30 by the first account. The print setting information is input by the first user U1. The designation information of the printer 60 indicates information on a serial number, an ID, a mail address, an address on the network of the printer 60, for example, used to specify the printer 60 serving as a communication counterpart. The print setting information includes, in addition to the designation information of the printer 60, settings of various items required for printing, such as a sheet size and a color/monochrome setting.

As is apparent from "2. Printer Registration Request", the printer registration request received by the SNS server 30 is transmitted from the SNS server 30 to the print control server 50.

The registration section 51 of the print control server 50 performs "3. Registration" in response to the printer registration request received from the SNS server 30. In this case, the registration section 51 performs registration by associating the first account serving as the source of the printer registration request with the print setting information included in the printer registration request and storing the first account and the print setting information in the storage region included in the print control server 50. Although briefly illustrated in FIG. 2 by an arrow mark of a dotted line, the registration section 51 may transmit information indicating that the registration is completed in response to the printer registration request to the first account that is the source of the printer registration request through the SNS server 30.

Subsequently, the second user U2 performs "4. Setting Share Request" in a state in which the registration of the printer 60 to be used in the SNS by the first account is completed and registration of the printer 60 to be used in the SNS by the second account is not completed. In this case, a setting share request that designates the first account to share the print setting information with the second account, that is, the "first account of a share source" is transmitted from the SNS application 26 to the SNS server 30 by the second account. The first account of the share source is information input by the second user U2, and naturally, a registration of the printer 60 of the first account is completed as described above.

As is apparent from "5. Setting Share Request", the setting share request received by the SNS server 30 is transmitted from the SNS server 30 to the print control server 50. The reception of the setting share request of the registration section 51 of the print control server 50 means a reception of a designation of the first account of the share source and a reception of a designation of the second account (hereinafter referred to as a "second account of a share destination") to be a share destination of a print setting associated with the first account of the share source. The registration section 51 performs "6. Issuance of Password" in response to the setting share request received from the SNS server 30. A password issued here is referred to as a "first password" for convenience sake.

The registration section 51 that has issued the first password performs "7. Password Notification" for notifying the first account of the share source designated by the setting share request of the first password. As is apparent from "7. Password Notification" and "8. Password Notification", the first password issued by the registration section 51 is transmitted from the print control server 50 to the SNS server 30 so as to be transmitted to the first account, that is, the first user U. In this way, the first password issued by the registration section 51 is transmitted to the first account through the SNS.

The registration section 51 that has issued the first password transmits "9. Password Request" for prompting input of a password to a source of the setting share request, that is, the second account of the share destination. As is apparent from "9. Password Request" and "10. Password Request", the password request is transmitted from the print control server 50 to the SNS server 30 so as to be transmitted to the second account, that is, the second user U2.

Figure 3:
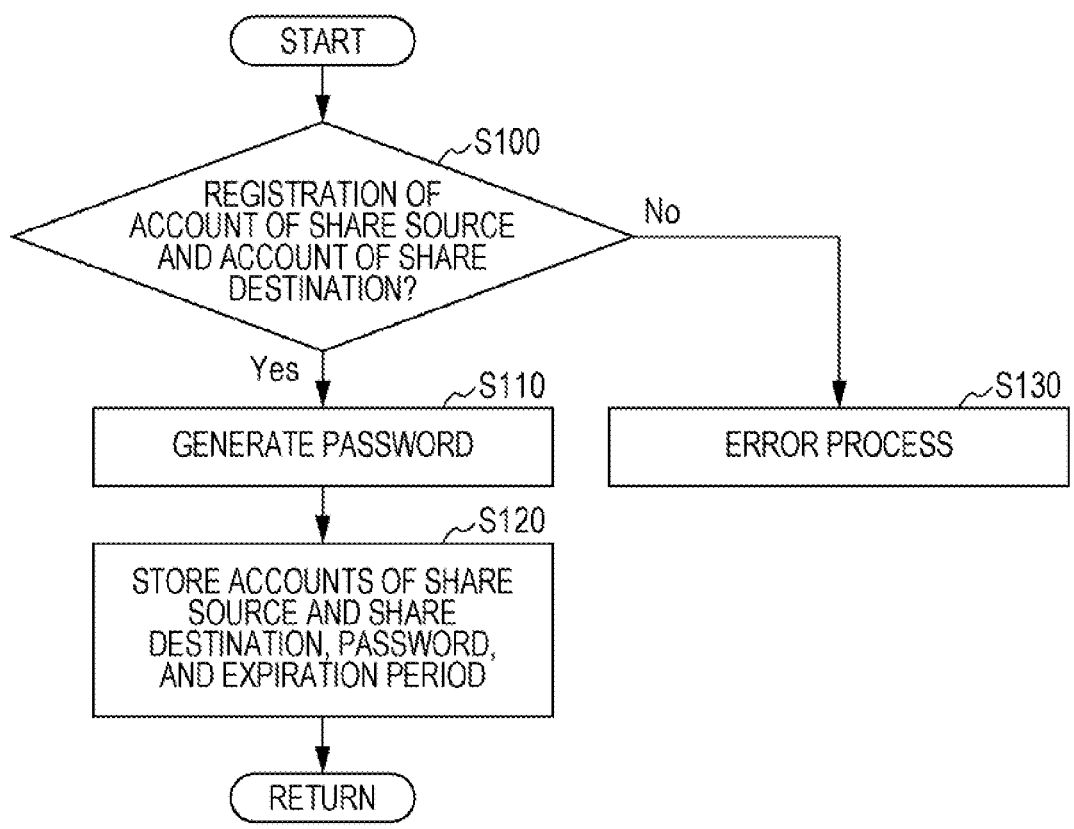
FIG. 3 is a flowchart illustrating in detail issuance of password.

FIG. 3 is a flowchart illustrating in detail "6. Issuance of Password" of FIG. 2. The registration section 51 starts the flowchart of FIG. 3 in response to a reception of the setting share request from the SNS server 30.

In step S100, the registration section 51 determines whether both the first account of the share source and the second account of the share destination have been registered as accounts of the SNS in the print control server 50. The term "registration" in step S100 simply means a registration of an account in the print control server 50 irrespective of presence or absence of registration of the printer 60.

Valid accounts of the SNS managed by the SNS server 30 are transmitted to the print control server 50 from the SNS server 30 and registered also in the print control server 50. Accordingly, in step S100, the registration section 51 makes an affirmative determination only when the first account of the share source coincides with one of the accounts registered in the print control server 50 and the second account of the share destination coincides with one of the accounts registered in the print control server 50, and the process proceeds to step S110. On the other hand, the registration section 51 makes a negative determination when the first account of the share source does not coincide with any of the accounts registered in the print control server 50 or the second account of the share destination does not coincide with any of the accounts registered in the print control server 50, and the process proceeds to step S130.

In step S130, the registration section 51 terminates the sequence of FIG. 2 after performing an error process. When the process proceeds to step S130, the registration section 51 does not execute any of "7. Password Notification" and "9. Password Request" in FIG. 2. In the error process, the registration section 51 transmits information indicating that the setting share request may not be accepted, that is, an error, as a message to the second account of the share destination, for example.

In step S110, the registration section 51 generates a password. The password generated in step S110 is a first password. Any method may be employed for generating the password.

In step S120, the registration section 51 stores, in association with one another, the first account of the share source, the second account of the share destination, the first password generated in step S110, and an expiration period of the first password in the print control server 50, and terminates the flowchart of FIG. 3. The registration section 51 may set the expiration period of the first password to approximately several minutes, for example. Such a first password having an expiration period is one of one-time passwords.

Returning to FIG. 2, the description is continued.

The second user U2 who has received "10. Password Request" through the SNS performs "11. Authentication Request". Specifically, the second user U2 performs an authentication request by posting the first password recognized by the first user U1 through the SNS in response to "8. Password Notification" on the SNS by the second account of the second user U2. Here, it is assumed that the first user U1 and the second user U2 are the same person or different persons having the close relationship, and therefore, the second user U2 may obtain the first password transmitted to the first user U1 through the SNS and perform posting on the SNS.

As is apparent from "12. Authentication Request", the authentication request including the password posted on the SNS by the second account is transmitted from the SNS server 30 to the print control server 50.

The registration section 51 performs "13. Authentication and Share Registration" in response to the authentication request received from the SNS server 30.

Figure 4:
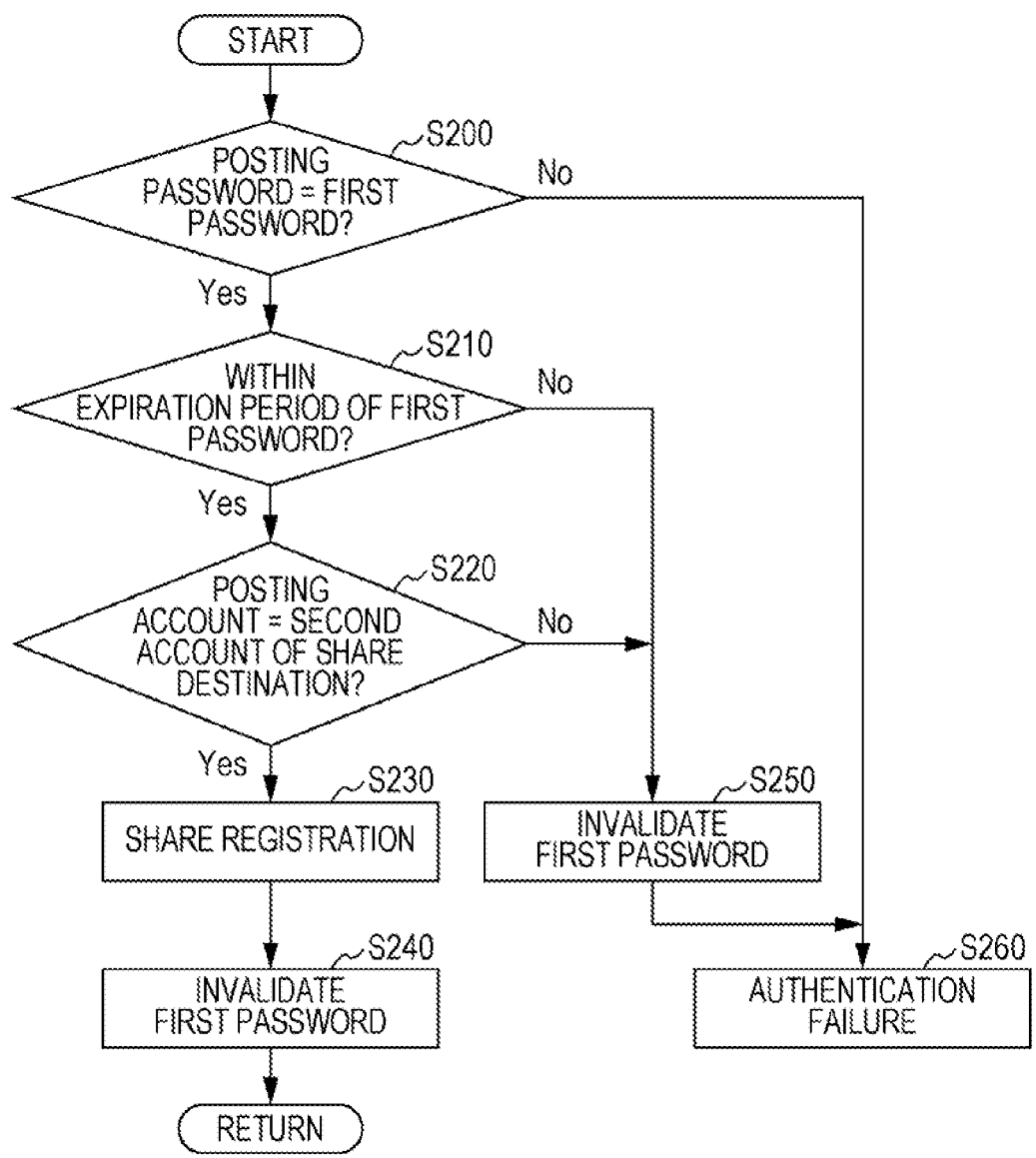
FIG. 4 is a flowchart illustrating in detail authentication and share registration.

FIG. 4 is a flowchart illustrating in detail "13. Authentication and Share Registration" of FIG. 2. The registration section 51 starts the flowchart of FIG. 4 in response to a reception of the authentication request from the SNS server 30. In the description made with reference to FIG. 4, the password included in the authentication information is referred to as a "posting password", and the second account that is the source of the authentication request is referred to as a "posting account".

In step S200, the registration section 51 determines whether one of first passwords stored in the print control server 50 coincides with the posting password. The registration section 51 makes an affirmative determination when the posting password coincides with one of the first passwords stored in the print control server 50 and proceeds to step S210, and makes a negative determination when the posting password does not coincide with any of the first passwords stored in the print control server 50 and proceeds to step S260. The first password stored in the print control server 50 corresponds to the first password that was stored in the past in step S120 and that is currently stored. Apparently, when the print control server 50 does not store any one of the first passwords in step S200, the determination is negative in step S200.

In step S210, the registration section 51 determines whether the expiration period of the first password determined to coincide with the posting password in step S200 is currently not expired. The registration section 51 makes an affirmative determination when the expiration period has not elapsed and proceeds to step S220, and on the other hand, makes a negative determination when the expiration period has elapsed and proceeds to step S250. When the determination is negative in step S210, the registration section 51 does not perform the determination in step S220 and determines that the posting password posted on the SNS by the posting account does not coincide with the first password issued when the setting share request is received from the second account.

In step S220, the registration section 51 determines whether the posting account coincides with the second account of a share destination stored in a state in which the second account is associated with the first password determined to coincide with the posting password in step S200. The registration section 51 makes an affirmative determination when the posting account coincides with the second account of the share destination stored in the state in which the second account is associated with the first password determined to coincide with the posting password in step S200 and proceeds to step S230, and otherwise, makes a negative determination and proceeds to step S250.

In the process in step S220 described above, the registration section 51 determines whether the second user U2 who has issued the setting share request is the same person as the second user U2 who has issued the authentication request. When the determination is affirmative in step S220, the registration section 51 determines that authentication of the user U has been successfully performed since it may be determined that the posting password posted on the SNS by the second account coincides with the first password issued when the setting share request is received from the second account.

In step S230, the registration section 51 associates the print setting information registered after being associated with the first account of the share source stored in a state in which the first account is associated with the first password determined to coincide with the posting password in step S200 also with the second account of the share destination stored in a state in which the second account is associated with the first password determined to coincide with the posting password in step S200 and registers the print setting information in the print control server 50. Specifically, share registration of the print setting information is performed. By this, the same print setting information is associated with the first account of the first user U1 and the second account of the second user U2.

In step S240 following step S230, the registration section 51 invalidates the first password determined to coincide with the posting password in step S200, and thereafter, the flowchart of FIG. 4 is terminated. The invalidation of the first password means removal of the first password from the print control server 50.

The registration section 51 invalidates, in step S250, the first password determined to coincide with the posting password in step S200 when the determination is negative in step S210 or step S220, and proceeds to step S260. The process in step S250 is the same as that in step S240. In step S260, the registration section 51 determines that the authentication of the user U has failed and terminates the sequence of FIG. 2. That is, the registration section 51 invalidates the first password in which it is determined whether the posting password posted on the SNS by the second account coincides with the first password issued when the setting share request is received from the second account, irrespective of the authentication performed through step S210 and step S220 so that the first password may not be used after that.

Although briefly illustrated by an arrow mark of a dotted line in FIG. 2, the registration section 51 may transmit information indicating that the share registration of the print setting information with the first account is completed in response to the authentication request to the second account that is the source of the authentication request through the SNS server 30.

Note that, when determining that the authentication has failed in step S260 of FIG. 4, the registration section 51 may transmit a message indicating that the authentication has failed or a message indicating that the share registration with the first account may not be performed to the second account that is the source of the authentication request.

After the share registration of the print setting information with the first account is completed, the second user U2 may post a print instruction ("14. Print Instruction" in FIG. 2) associated with a file on the SNS by the second account. The print instruction posted on the SNS by the second account is transmitted to the print control server 50 from the SNS server 30 as indicated by "15. Print Instruction". The print control server 50 obtains the print setting information registered in a state in which the print setting information is associated with the second account of the transmission source of the print instruction in response to the print instruction ("16. Obtainment of Settings"), and executes "17. Printing" in accordance with the obtained print setting information. Specifically, the print control server 50 causes the printer 60 designated by the obtained print setting information to execute printing of a file indicated by the print instruction in accordance with settings designated by the print setting information.

Although not illustrated in FIG. 2, apparently, the first user U1 posts the print instruction associated with a file on the SNS by the first account so as to cause the print control server 50, through the SNS server 30, to execute printing by the printer 60 in accordance with the print setting information registered in the print control server 50 in a state in which the print setting information is associated with the first account.

3. Conclusion

As described above, the print control server 50 for controlling printing through an SNS includes the registration section 51 configured to register, in association with each other, the first account that is an account of the user of the SNS and print setting information including designation information of the printer 60 to be used for printing. Furthermore, the registration section 51 issues a first password when accepting a designation of the first account and a designation of the second account that is an account of a user of the SNS that is to be the share destination of the print setting, notifies the first account of the first password through the SNS, and registers, when the password posted on the SNS by the second account coincides with the first password, the print setting information registered in association with the first account also in association with the second account.

With this configuration, the user U may designate the first account and the second account that is to be the share destination of the print setting in a state in which the first account and the print setting information associated with each other are registered in the print control server 50 so as to register the print setting information registered in association with the first account also in association with the second account. In this way, a burden of the user U in which a setting process, such as input of the print setting information by different accounts to use the printer 60 by the different accounts in the same SNS, is repeatedly performed in the general technique may be reduced. Furthermore, when the user U desires to share the printer 60 and the print setting to be used by the different accounts in the same SNS and when the same print setting information is individually input by the different accounts as performed in the general techniques, it is highly likely that the sharing fails due to an input error. However, according to this embodiment, such a risk may be reduced. Specifically, the printer 60 may be easily shared by the different accounts in the same SNS.

Furthermore, with the configuration described above, the registration section 51 notifies the first account of the share source of the first password issued in response to a reception of a designation of the first account of the share source and a designation of the second account of the share destination through the SNS and obtains a password posted on the SNS by the second account so as to determine whether the password coincides with the first password. In this way, the share registration of the print setting information associated with the first account may be performed for the user U having the first account of the share source or the user U having the close relationship with the user U having the first account of the share source. Accordingly, a risk of leakage of the print setting information to a third party which does not relate to the user U having the first account of the share source and a risk of the share registration performed by the third party may be reduced.

Furthermore, according to this embodiment, after determining whether the password posted on the SNS by the second account coincides with the first password, the registration section 51 may invalidate the first password.

With this configuration, security of the sharing of the print setting information may be improved by invalidating the first password used once in the authentication irrespective of success or failure of the authentication of the user U using the first password.

Furthermore, according to this embodiment, the registration section 51 sets an expiration period of the first password, and when the password is posted on the SNS by the second account, in a case in which the expiration period of the first password elapsed, the registration section 51 may determine that the password posted on the SNS by the second account does not coincide with the first password.

With this configuration, the security of the sharing of the print setting information may be improved by setting the expiration period of the first password.

The registration section 51 may obtain the password posted by the second account by means of a chat function provided by the SNS.

The user U may perform any posting and view posts of other users by using the chat function provided by the SNS so as to communicate with the other users. Therefore, the user U may also post the password by the second account by using the chat function provided by the SNS. Specifically, the posting by the second user U2 and the various notifications from the registration section 51 to the second user U2, that are illustrated in FIG. 2, may be performed one to one, for example, using the chat function provided by the SNS. With this configuration, the second user U2 may communicate with the registration section 51 similarly to general chats. The posting by the first user U1 and the various notifications from the registration section 51 to the first user U1, that are illustrated in FIG. 2, may also be performed using the chat function provided by the SNS.

This embodiment discloses various categories including a method, a system, and a program, in addition to a print control server.

For example, a print control method for controlling printing through an SNS includes a registering step of registering, in association with each other, a first account that is an account of a user of the SNS and print setting information including designation information of the printer 60 to be used for printing (refer to FIG. 2). The registering step issues a first password when accepting a designation of the first account and a designation of the second account that is an account of a user of the SNS and that is to be the share destination of the print setting, notifies the first account of the first password through the SNS, and registers, when a password posted on the SNS by the second account coincides with the first password, the print setting information registered in association with the first account also in association with the second account.

What is claimed is:

1. A print control server that controls printing through a social networking service (SNS), the print control server comprising:
a registration section configured to register, in association with each other, a first account that is an account of a user of the SNS and print setting information including designation information of a printer to be used for printing, wherein
the registration section
issues a first password when accepting a designation of the first account and a designation of a second account that is an account of a user of the SNS and that is to be a share destination of a print setting,
notifies the first account of the first password through the SNS, and
registers, when a password posted on the SNS by the second account coincides with the first password, the print setting information registered in association with the first account also in association with the second account.

2. The print control server according to claim 1, wherein after determining whether the password posted on the SNS by the second account coincides with the first password, the registration section invalidates the first password.

3. The print control server according to claim 1, wherein the registration section sets an expiration period of the first password, and, when the password is posted on the SNS by the second account, in a case in which the expiration period of the first password elapsed, the registration section determines that the password posted on the SNS by the second account does not coincide with the first password.

4. The print control server according to claim 1, wherein the registration section obtains a password posted by the second account by means of a chat function provided by the SNS.

5. A print control method for controlling printing through a social networking service (SNS), the print control method comprising:
a registering step of registering, in association with each other, a first account that is an account of a user of the SNS and print setting information including designation information of a printer to be used for printing, wherein
the registering step
issues a first password when accepting a designation of the first account and a designation of a second account that is an account of a user of the SNS and that is to be a share destination of a print setting,
notifies the first account of the first password through the SNS, and
registers, when a password posted on the SNS by the second account coincides with the first password, the print setting information registered in association with the first account also in association with the second account.

* * * * *